United States Patent [19]

Goebel

[11] Patent Number: 5,901,317

[45] Date of Patent: * May 4, 1999

[54] METHOD AND SYSTEM FOR REGISTER ALLOCATION USING MULTIPLE INTERFERENCE GRAPHS

[75] Inventor: Kurt J. Goebel, Mountain View, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/621,409

[22] Filed: Mar. 25, 1996

[51] Int. Cl.$^6$ ...................................................... G06F 9/45
[52] U.S. Cl. .............................................................. 395/709
[58] Field of Search ............................................. 395/709

[56] References Cited

U.S. PATENT DOCUMENTS

| | | | |
|---|---|---|---|
| 4,571,678 | 2/1986 | Chaitin | 395/707 |
| 4,667,290 | 5/1987 | Goss et al. | 395/707 |
| 4,763,255 | 8/1988 | Hopkins et al. | 395/709 |
| 4,782,444 | 11/1988 | Munshi et al. | 395/709 |
| 5,175,856 | 12/1992 | Van Dyke et al. | 395/704 |
| 5,233,691 | 8/1993 | Ando et al. | 395/872 |
| 5,249,295 | 9/1993 | Briggs et al. | 395/709 |
| 5,293,631 | 3/1994 | Rue et al. | 395/709 |
| 5,418,958 | 5/1995 | Goebel | 395/709 |
| 5,481,706 | 1/1996 | Peek | 395/726 |
| 5,530,866 | 6/1996 | Koblenz et al. | 395/708 |
| 5,590,329 | 12/1996 | Goodnow, II et al. | 395/708 |
| 5,659,754 | 8/1997 | Grove et al. | 395/709 |

FOREIGN PATENT DOCUMENTS 0 051 131 A   5/1982   European Pat. Off. .......... G06F 9/44

OTHER PUBLICATIONS

Book: "The Sparc Architecture Manual", Publisher: PTR Prentice Hall, Version 9, Editor(s): David L. Weaver and Tom Germond, Printed: 1994, Page(s): 294–298.

Book: "Compilers Principles, Techniques, and Tools", Publisher: Addison–Wesley, Chapter 8—Intermediate Code Generation, Author(s): Alfred V. Aho, Ravi Sethi and Jeffrey D. Ullman, Printed: Mar. 1988, Page(s): 463–512.

R.B. Grove, D.S. Blickstein, K.D. Glossop and W.B. Noyce, "GEM Optimizing Compilers for Alpha AXP Systems," Compcon Spring '93, San Francisco, California, Feb. 22–26, 1993, pp. 465–473.

David Shear, "HLL compilers and DSP run–time libraries make DSP–system programming easy," Electronic Design News 33 (1988) Jun. 23, No. 13, Newton, MA, USA, Total pages: six.

Ronald E. Kole, "Optimizing Compiler Exploits DSP Features," High Performance Systems 11 (1990) Feb., No. 2, Manhasset, NY, US, Total pages: five.

Douglas B. Powell, "Direct Synthesis of Optimized DSP Assembly Code From Signal Flow Block Diagrams," Copyright 1992, IEEE, pp. V–553–V–556.

Gregory J. Chaitin et al., "Register Allocation Via Coloring," Computer Languages, vol. 6, 1981, pp. 47–57.

Fred C. Chow et al. "The Priority–Based Coloring Approach to Register Allocation," ACM Transactions on Programming Languages and Systems, vol. 12, No. 4, Oct. 1990, pp. 501–536.

*Primary Examiner*—Emanuel Todd Voeltz
*Assistant Examiner*—John Q. Chavis
*Attorney, Agent, or Firm*—Graham & James LLP

[57] ABSTRACT

Allocation of real registers to virtual or symbolic registers represented by nodes in an interference graph is performed with a compiler using a primary interference graph and a secondary interference graph. The primary interference graph contains the standard edges indicating latency between virtual registers represented by nodes linked by the edges. Secondary links between nodes indicate conditional conflicts which can be tolerated but which, if avoided in the register allocation process, improve the execution speed of program segments. The conditional conflict specifically referenced is the requirement for paired register designation in single precision floating point operations in which registers are identified as pairs, rather than as individual registers.

9 Claims, 3 Drawing Sheets

METHOD AND SYSTEM FOR REGISTER ALLOCATION USING MULTIPLE INTERFERENCE GRAPHS

BACKGROUND OF THE INVENTION

This invention relates to the optimization of register allocation in data processing systems during program compile time. More particularly, this invention relates to register allocation optimization using interference graph coloring techniques.

Register allocation using interference graph coloring techniques is known and has been widely adopted for use in assigning real registers to symbolic or virtual registers when a program is being compiled prior to execution. The standard technique is disclosed in U.S. Pat. No. 4,571,678 and U.S. Pat. No. 5,249,295, the disclosures of which are hereby incorporated by reference. In general, the technique proceeds by creating in the data processing system compiler a register interference graph using symbolic or virtual registers, with the symbolic registers as individual nodes in the graph. For those nodes in which the contents are concurrently live, such nodes are connected by an edge. Once the interference graph is constructed, those nodes having a degree less than k, where k is the number of real registers available in the data processing system, are deleted from the graph in some logical fashion. Nodes of degree greater than or equal to k are selected for a spilling operation, in which the contents of the real registers (when the program is executed) will be stored elsewhere for later recall. A new interference graph is thereafter constructed, and each node is examined in the same fashion. This iterative process continues until all nodes have been removed from the interference graph. Thereafter, the nodes are examined in reverse order and assigned individual colors (in actuality real register numbers) and the process is thus completed.

While generally effective in allocating real registers when a program is being compiled, many specific applications provide conditional constraints which result in less than optimal register allocation as a result of the interference graph coloring technique. For example, in some data processing systems employing single precision floating point operations, real registers are bound together as pairs, with a resulting inability of the data processing system to distinguish between individual registers of a pair. If one of the paired registers is allocated to a first node and the other one of the register pair is allocated to a second node with common latency with the first node (i.e., the first and second nodes are linked with an edge), an interlock condition will exist in which the system must wait several machine cycles for the completion of the execution of a given instruction before the next instruction is permitted to proceed. While the delay in execution introduced by a float interlock condition is usually not so great as that induced by a spill operation, the execution time of that portion of the program still suffers, which is undesirable and less than optimal.

SUMMARY OF THE INVENTION

The invention comprises an improved interference graph register allocation technique which avoids the execution time delay introduced by conditional constraints (such as the single precision floating point register pairing constraint) and provides optimal allocation of real registers during compilation of the program into machine executable form.

From a process standpoint, the invention comprises a method of optimizing the allocation of real registers in a data processing system CPU which proceeds by creating a primary interference graph having nodes representing variable registers and primary edges linking nodes with concurrent latency, the number of edges of a given node being termed the degree of the node. A secondary interference graph is then created having nodes representing virtual registers and secondary edges linking nodes with conditional conflicts which can be tolerated but which are not optimal, such as a node requiring the use of one of a pair of paired registers in a single precision floating point operation. Nodes having degrees less than the number of available CPU real registers are selected from the primary interference graph until all nodes have been so selected. Thereafter, an attempt is made to allocate real registers to the selected nodes in the reverse order of their selection by first determining whether a register can be allocated for a selected node using the edge constraints of both the primary and secondary interference graphs. If so, allocation of the real register to a given node is done on the basis of both the primary and secondary interference graphs. If a register cannot be allocated for a selected node using the edges of both the primary and secondary interference graphs, the real register is allocated on the basis of the primary graph alone. The step of allocating is preferably performed on nodes in the reverse order from which the nodes were originally selected: i.e., the first selected node receives the last register allocation.

From a system standpoint, the invention comprises a data processing system having a CPU with a fixed number of allocatable registers, and a compiler including a first procedure for creating a primary interference graph having nodes representing virtual registers and primary edges linking nodes with concurrent latency, the number of edges of a given node being the degree of the node, a second procedure for creating a second interference graph having nodes representing virtual registers and secondary edges linking nodes with conditional conflicts, a third procedure for selecting nodes from the primary interference graph having a degree less than the number of CPU registers until all nodes have been selected from the primary interference graph, and a fourth procedure for allocating real registers to the selected nodes by first determining whether a register can be allocated for a selected node using the edges of both the primary and secondary interference graphs and, if so, allocating a real register on that basis; and, if not, allocating a real register using the edges of the primary graph alone. The allocating procedure is performed on nodes in the reverse order from which the nodes were originally selected. In a specific embodiment of the procedures, the secondary interference graph edges link a virtual register requiring use of a paired register with another virtual register having common latency.

For a fuller understanding of the nature and advantages of the invention, reference should be made to the ensuing detailed description, taken in conjunction with the accompanying drawings.

DETAILED DESCRIPTION OF THE PREFERRED EMBODIMENTS

Figure 1:
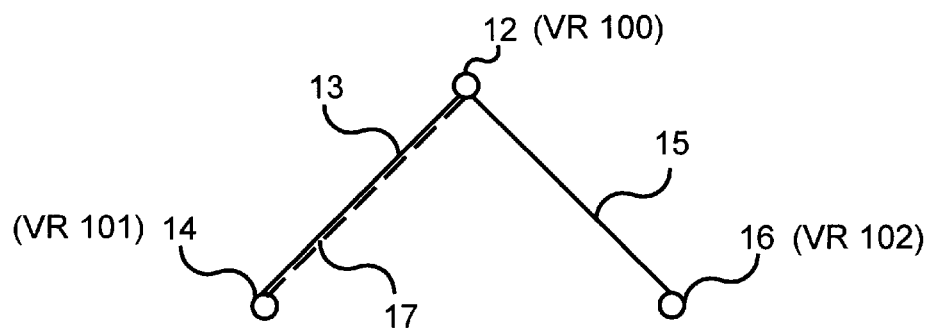
FIG. 1 is an interference graph illustrating the invention.

Turning now to the drawings, FIG. 1 is a simplified interference graph illustrating the invention. As seen in this figure, the interference graph has three nodes: node 12 representing virtual register 100, node 14 representing virtual register 101 and node 16 representing virtual register 102. Nodes 12 and 14 are joined by a first primary edge 13 denoting common latency between the contents of these two registers. Similarly, nodes 12 and 16 are joined by a primary edge 15 illustrating common latency between the contents of these two registers. In addition, nodes 12 and 14 are joined by a secondary edge 17 denoting a secondary conflict between the contents of these two nodes. The secondary conflict is a conditional conflict: i.e., one which can be tolerated but which, if avoided, will optimize the assignment of real registers to the virtual registers at nodes 12 and 14. For example, in the single precision floating point operation noted above, the secondary link 17 may denote that the contents of one of the nodes 12, 14 is stored in one of two paired registers which cannot be readily distinguished by the system. In such a case, the real register assignment for one of the two nodes 12, 14 should be some other register than the remaining register in the pair.

Interference graph 10 of FIG. 1 is actually constructed during compile time by assigning a pair of vectors to each node: one vector representing primary links and the other vector representing the secondary links. Although the interference graph of FIG. 1 illustrates only three nodes for simplicity and clarity, it is understood that many nodes typically exist in a given interference graph.

Figure 2:
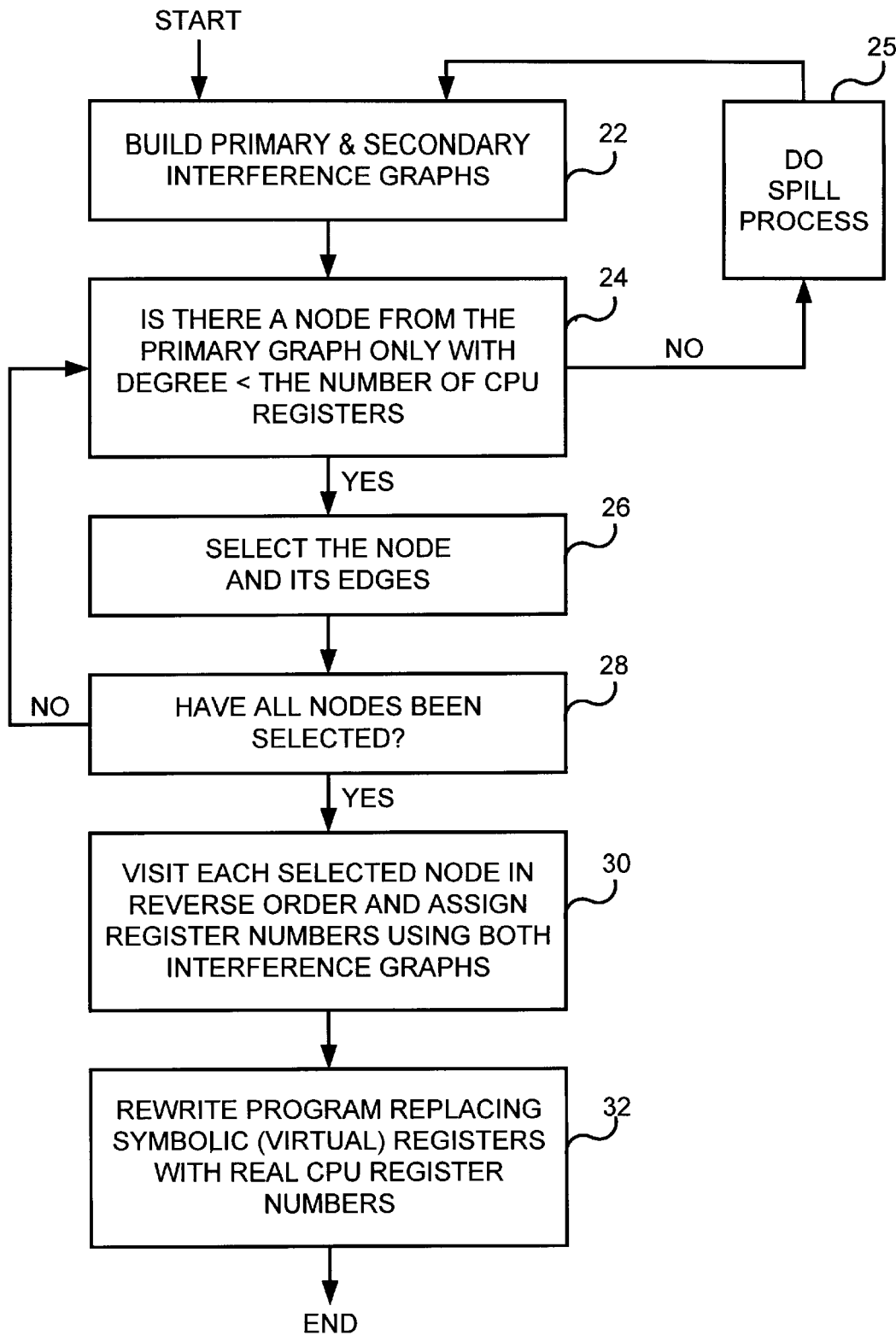
FIG. 2 is a flow chart illustrating the overall interference graph coloring technique of the invention.

Once the graph has been constructed, real register assignments or "coloring" is attempted using both the primary and secondary components of the interference graph. FIG. 2 is a flow chart illustrating the overall process. As seen in this figure, the register allocation technique of the present invention begins with a step of building the primary interference graph and the secondary interference graph in step 22. Next, a check is made to determine whether there is a node in the primary interference graph only having a degree less than the number of machine registers. If not, then a conventional spill routine 25 is entered, and a new primary and secondary interference graph are constructed in a second pass through step 22.

If there is a node with a degree less than the number of machine registers, then that node and its edges are marked for selection in step 26. Next, the graph is tested in step 28 to determine whether all nodes have been selected and, if not, the routine returns to step 24 to select another node and its edges.

Once all of the nodes from the primary interference graph have been selected, real register numbers are assigned to the individual selected nodes in step 30, in reverse order from the order of selection of the nodes and using both the primary and secondary interference graphs. Lastly, the program is rewritten in step 32 by replacing symbolic registers with real machine register numbers, which terminates the register allocation technique.

Figure 3:
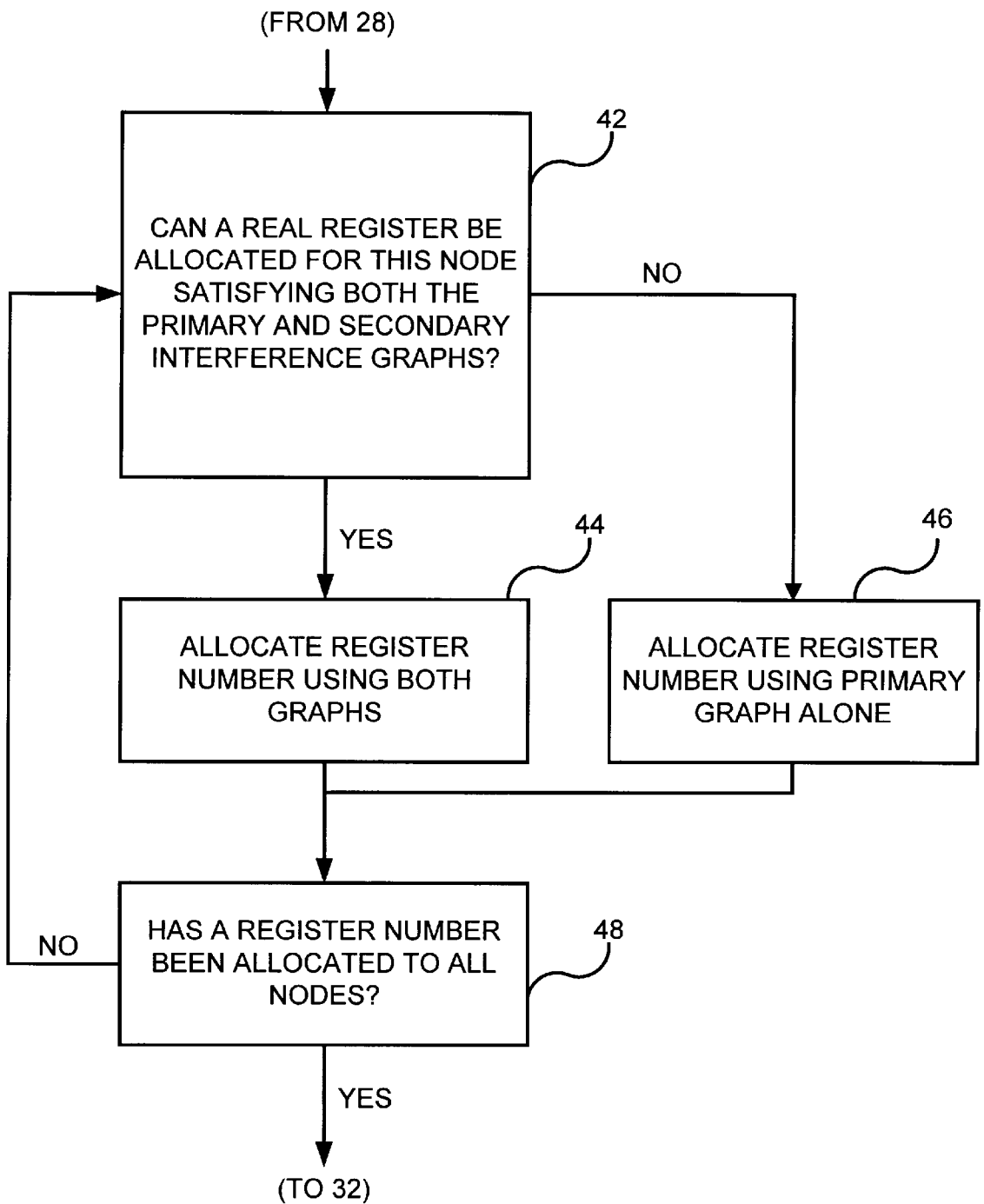
FIG. 3 is a flow chart illustrating the use of a primary and a secondary interference chart according to the invention.

FIG. 3 illustrates step 30 of assigning real register numbers in more detail. As seen in this figure, as each selected node is visited, a test is made in step 42 to determine whether a real register can be allocated for this node in a manner which satisfies both the primary and secondary interference graphs. If so, the register number is allocated using both the primary and secondary interference graphs in step 44. If not, a register number is allocated using the primary interference graph alone in step 46. Thereafter, a test is made to determine whether the last node has been allocated a real register. If not, the routine returns to step 42. Once the last node has been allocated a real register, the routine enters the last step 34 of the overall allocation process.

Figure 4:
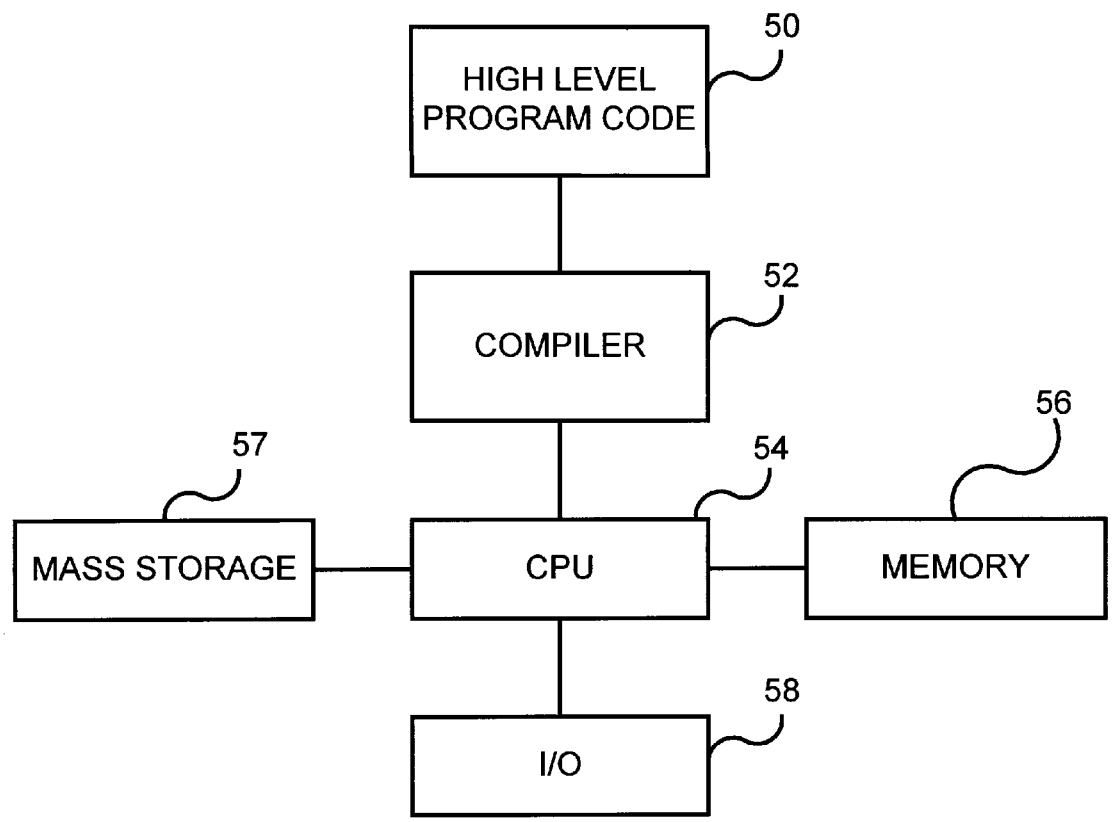
FIG. 4 is a block diagram of a data processing system incorporating the invention.

The register allocation technique described above is implemented in a data processing system such as that illustrated in FIG. 4. As seen in this figure, a program in a high level form (such as source code written in C+ or C++) is supplied from a source 50 to a compiler 52. The compiler 52 conducts the register allocation procedure (and other optimization procedures) and produces assembly code which is supplied to a CPU 54 having main memory 56, mass storage 57 and various I/O devices 58. The CPU contains the real registers which are allocated to the virtual or symbolic registers as a result of the interference graph coloring technique.

As noted above, the secondary interference graph is constructed in order to indicate conflicts between nodes which are conditional and which thus may be tolerated albeit at the expense of optimal use of the real registers in executing various program segments. The following is an example of a Sparc assembly language instruction sequence in which the secondary interference graph edges have been used (in combination with the primary interference graph edges) in order to allocate registers in a manner to eliminate the conditional conflict of a floating point interlock.

```
************************************************************
/* 0x0208  51 (80 86) */ fdivs    %f7,%f9,%f2
/* 0x020c  45 (80 82) */ ld       [%sp+156},%10
/* 0x0210   0 (80 80) */ add      %14,%1o(__BLNK__+1050620),%12
************************************************************
/* 0x0214  44 (81 82) */ st       %o0,[%sp+100]
/* 0x0218   0 (81 81) */ add      %16,%1o(__BLNK__+6314000),%i1
************************************************************
/* 0x021c  56 (82 84) */ ld       [%i5],%f0
/* 0x0220  45 (82 82) */ add      %10,1,%o0
/* 0x0224   0 (82 82) */ sethi    %hi(__BLNK__+7366676),%11
************************************************************
/* 0x0228  47 (83 85) */ ld       [%i0-8],%f10
/* 0x022c  56 (83 83) */ cmp      %o0,1
/* 0x0230  55 (83 83) */ or       %g0,%o0,%16
************************************************************
/* 0x0234  45 (84 85) */ st       %o0,[%sp+96]
/* 0x0238   0 (84 84) */ add      %11,%1o(__BLNK__+7366676),%14
************************************************************
/* 0x023c  56 (85 87) */ ld       [%sp+140],%f4
************************************************************
```

In this example, instruction groups which issue in the same machine cycle are separated by the lines constructed of asterisks. The first instruction is an instruction termed the fdivs instruction. The pair of numbers (80 86) indicates that the instruction will issue in cycle 80 and is expected to complete in cycle 86. Consequently, the fdivs instruction will be executing through all of the shown instruction groups (since the last group is issuing in cycle 85). The fdivs instruction is an instruction involving potential flow interlock, and since the result of the instruction is to be stored in register f2, optimal register allocation requires that no instruction use paired register f3 during any of machine cycles 80–86. Otherwise, such an instruction would be interlocked from commencing execution until the end of execution of the fdivs instruction (i.e., machine cycle 86). By selecting a real register other than f3 (and f2), the float interlock problem is avoided and the set of instructions can proceed with maximum execution speed.

While the above provides a full and complete disclosure of the preferred embodiments of the invention, various modifications, alternate constructions and equivalents may be employed. For example, while the secondary interference graph has been expressly described with reference to the single precision floating point interlock problem involving paired registers, other conditional constraints may be employed, as desired, in constructing the secondary interference graph. Similarly, the invention is not limited to the use of only a single primary and a single secondary interference graph, but may also be extended to tertiary graphs and graphs of other levels as well. Therefore, the above should not be construed as limiting the invention, which is defined by the appended claims.

What is claimed is:

1. A computer implemented method for use in a compiler for allocating real registers in a CPU to instructions of a target computer program which are to be executed on the CPU, said method comprising the steps of:

creating a representation of a primary interference graph having nodes representing virtual registers and primary edges linking nodes with concurrent latency, the number of edges of a given node being the degree of the node;

creating a representation of a second interference graph having nodes representing virtual registers and secondary edges linking nodes with conditional conflicts;

selecting nodes from the primary interference graph having degrees less than the number of CPU registers until all nodes have been selected; and allocating real registers to said selected nodes by first determining whether a register can be allocated for a selected node using the edges of both the primary and secondary interference graphs and, if so, allocating a real register on that basis; and, if not, allocating a real register using the edges of the primary graph alone.

2. The method of claim 1 wherein the step of allocating is performed on nodes in the reverse order from which the nodes were originally selected.

3. The method of claim 1 wherein the secondary interference graph edges link a virtual register requiring use of a paired register with another virtual register.

4. A computer system comprising:

a central processing unit (CPU) having a finite number of allocatable registers; and a compiler including a first procedure for creating a representation of a primary interference graph having nodes representing virtual registers and primary edges linking nodes with concurrent latency, the number of edges of a given node being the degree of the node, a second procedure for creating a representation of a secondary interference graph having nodes representing virtual registers and secondary edges linking nodes with conditional conflicts; a third procedure for selecting nodes from the primary interference graph having a degree less than the number of CPU registers until all nodes have been selected from the primary interference graph; and a fourth procedure for allocating real registers to the selected nodes by first determining whether a register can be allocated for a selected node using the edges of both the primary and secondary interference graphs and, if so, allocating a real register on that basis; and, if not, allocating a real register using the edges of the primary graph alone.

5. The computer system of claim 4 wherein said fourth procedure is performed on nodes in the reverse order from which the nodes were originally selected.

6. The computer system of claim 4 wherein the secondary interference graph edges link a virtual register requiring use of a paired register with another virtual register.

7. A computer program product comprising:

a computer usable medium having computer readable code embodied therein for optimizing allocation of real registers in a computer system, the computer program product comprising:

a first set of computer readable program code devices for creating a representation of a primary interference graph having nodes representing virtual registers and primary edges linking nodes with concurrent latency, the number of edges of a given node being the degree of the node, and for creating a representation of a secondary interference graph having nodes representing virtual registers and secondary edges linking nodes with conditional conflicts;

a second set of computer readable program code devices configured to cause a computer to select nodes from the primary interference graph having degrees less than the number of real registers in the computer system until all nodes have been selected; and a third set of computer readable program code devices configured to cause a computer to allocate real registers to the selected nodes by first determining whether a real register can be allocated for a selected node using the edges of both the primary and secondary interference graphs and, if so, allocating a real register on that basis; and, if not, allocating a real register using the edges of the primary graph alone.

8. The computer program product of claim 7 wherein said first set of computer readable program code devices is configured to cause a computer to create a representation of a secondary interference graph having secondary edges linking a virtual register requiring use of a paired register with another virtual register.

9. The computer program product of claim 7 wherein said third set of computer readable program code devices is configured to cause a computer to perform the allocation of real registers in the reverse order from which the nodes were originally selected.

* * * * *